United States Patent
Hirata (10) Patent No.: US 8,280,649 B2
(45) Date of Patent: Oct. 2, 2012

(54) BOARD OR ELECTRONIC COMPONENT WARP ANALYZING METHOD, BOARD OR ELECTRONIC COMPONENT WARP ANALYZING SYSTEM AND BOARD OR ELECTRONIC COMPONENT WARP ANALYZING PROGRAM

(75) Inventor: Ichiro Hirata, Tokyo (JP)

(73) Assignee: NEC Corporation, Tokyo (JP)

(*) Notice: Subject to any disclaimer, the term of this patent is extended or adjusted under 35 U.S.C. 154(b) by 447 days.

(21) Appl. No.: 12/306,491

(22) PCT Filed: Jun. 25, 2007

(86) PCT No.: PCT/JP2007/063188
§ 371 (c)(1),
(2), (4) Date: Dec. 23, 2008

(87) PCT Pub. No.: WO2008/001922
PCT Pub. Date: Jan. 3, 2008

(65) Prior Publication Data
US 2009/0276164 A1 Nov. 5, 2009

(30) Foreign Application Priority Data
Jun. 27, 2006 (JP) .................................. 2006-176389

(51) Int. Cl.
*G01L 1/00* (2006.01)
*G01K 5/00* (2006.01)
(52) U.S. Cl. .......................................... 702/42; 374/187
(58) Field of Classification Search .................... 702/42, 702/33–36, 43, 81, 84, 99, 130–131, 136, 702/179, 182–185; 703/1, 4; 374/100–103, 374/137, 139, 187; 257/678, 684, 686–687, 257/777–778; 264/272.11, 272.13–272.14, 264/272.17
See application file for complete search history.

(56) References Cited

FOREIGN PATENT DOCUMENTS

| JP | 1998320432 A | 12/1998 |
|----|--------------|---------|
| JP | 2004013437 A | 1/2004 |

OTHER PUBLICATIONS

Srikanth, Narasimalu, Warpage Analysis of Epoxy Molded Packages Using Viscoelastic Based Model, Published online: Apr. 10, 2006, J Mater Sci 41, pp. 3773-3780.*

Juhachi Oda et al., "Analysis of Stress and Deflection of Printed Plate Board Using Multilayered Beam Theory", Articles of Japan Society of Machinery Engineers, (Jul. 1993), vol. 59, No. 563, pp. 203-208.

Kiyoshi Miyake et al., "Viscoelastic Warpage Analysis of Surface Mount Package", Journal of Electronic Packaging, vol. 123, (Jun. 2001), pp. 101-104.

(Continued)

*Primary Examiner* — Toan M Le (57) ABSTRACT

Board warp analysis includes dividing a temperature profile with respect to an electronic component by a predetermined time. A relaxation elastic modulus of the electronic component corresponding to the divisional time is obtained by shifting on a time base of a master curve related to the electronic component A curing degree of the electronic component is calculated based on a relationship between a time after shift and an actually applied temperature. A warp of the electronic component is analyzed based on a relaxation elastic modulus on the master curve or a relaxation elastic modulus calculated based on a relationship between the curing degree and the elastic constant according to a value of the curing degree calculated.

48 Claims, 6 Drawing Sheets

OTHER PUBLICATIONS

Ichiro Hirata et al., "Study of LSI-package Warp Deformation Using FEM Visco-elastic Simulation", "11th Symposium on Mircojoining and Assembly Technology in Electronics", Feb. 3-4, 2005, pp. 329-332.

Osamu Ina et al., "The Development of Simulation Technology of Heat Curing Processes of Resins", Denso Technical Review, vol. 7, No. 2., Aug. 6, 2002, pp. 69-75.

Kiyoshi Miyake, "Thermo-Viscoelastic Analysis for Warpage of Ball Grid Array Packages Taking into Consideration of Chemical Shrinkage of Molding Compound", Transactions of Japan Institute of Electronics Packaging, vol. 7, No. 1 (2004), pp. 54-61.

International Search Report for PCT/JP2007/063188 mailed Aug. 28, 2007.

* cited by examiner

BOARD OR ELECTRONIC COMPONENT WARP ANALYZING METHOD, BOARD OR ELECTRONIC COMPONENT WARP ANALYZING SYSTEM AND BOARD OR ELECTRONIC COMPONENT WARP ANALYZING PROGRAM

INCORPORATION BY REFERENCE

This application is the National Phase of PCT/JP2007/063188, filed Jun. 25, 2007, which claims priority to Japanese Application No. 2006-176389, filed on Jun. 27, 2006. The content of which are incorporated by reference in its entirety.

TECHNICAL FIELD

The present invention relates to a board or electronic component warp analyzing method, a board or electronic component warp analyzing system and a board or electronic component warp analyzing program for predicting, with high precision, a warp caused by molding of an LSI (Large Scale Integration) package such as a BGA (Ball Grid Array) or a CSP (Chip Size Package) and warps of electronic components using a resin in general to obtain an optimum condition for preventing connection reliability deterioration which is caused by warps occurring in a printed wiring board and an electronic component in a reflow process of mounting an electronic component having these warps on a printed wiring board by a soldering material.

BACKGROUND ART

In recent years, with electronic apparatuses being rapidly made into light, thin and small in size, high density and high reliability are strongly demanded in packaging techniques, while LSI (Large Scale Integration) packages tend to be large in size and thin due to multi-pin for the purpose of high performance. Therefore, at the time of molding a plurality of LSI, warps occur in an LSI package while a mold resin is cured and contracted. Furthermore, in a reflow process of mounting these LSI packages on a printed wiring board, in addition to a warp occurring in molding, heat generated in the reflow process causes a mold resin and the printed wiring board to make complicated warping behavior. This warp might cause defective connection with solder at the time of reflow, which is a cause of large deterioration in connection reliability. Moreover, it is difficult to incorporate a warping printed wiring board into a thin casing, which is among factors in an increase in a proportion defective.

For solving the problem, related corporations, universities and research organizations have developed techniques aiming at first comprehending warping behavior at the time of reflow in advance and taking warp reduction measures at an upstream stage of designing because it is extremely hard to consider curing and contraction of a mold resin. In this technical development, because it is difficult to monitor warping behavior of an LSI package or a printed wiring board at a high temperature in experiment, various warping prediction techniques have been studied hard. Executed at an early stage is, as shown in non-patent Literature 1, a study of board warp prediction based on multilayered beam theory which is expansion of elastic beam theory and further executed is simulation using the Finite Element Method (FEM) for calculating a warp of a printed wiring board with an electronic component mounted, of which proposed is, for example, a system for calculating a warp of a printed wiring board by elasticity analysis as recited in Patent Literature 1. Moreover, as a highly precise prediction technique taking viscoelasticity of a resin used in a board or in an electronic component mounted thereon into consideration, proposed are FEM viscoelasticity analysis techniques as recited in non-patent Literature 2 and non-patent Literature 3.

The methods disclosed in the non-patent Literature 1 and Patent Literature 1 as the examples of the related technique are prediction techniques by elasticity analysis whose elasticity analysis results largely differ from actually measured warps, which fact is reported in the non-patent Literature 3. For solving the problem, it is necessary to take viscoelasticity of various kinds of resin materials used in a board or a component mounted thereon into consideration and to execute FEM viscoelasticity analyses recited in the non-patent Literature 2 and the non-patent Literature 3. In the viscoelasticity analysis methods used in the non-patent Literature 2 and the non-patent literature 3, analyses are made based on viscoelastic characteristics as of after curing in a resin material curing process. Therefore, non-patent Literature 4, which is one example of the related techniques, for example, recites an analysis method which enables a curing degree of the resin material (mold (curing degree<1), reflow (curing degree=1)) to be taken into consideration, which technique has made possible analyses taking a resin curing process into consideration.

Patent Literature 1: Japanese Patent Laying-Open No. 2004-013437.

Non-patent Literature 1: Juhachi Oda, "Analysis of Stress and Deflection of Printed Plate Board Using Multilayered Beam Theory", Articles of Japan Society of Machinery Engineers, vol. 59, No. 563, pp. 203-208, 1993.

Non-patent Literature 2: K. Miyake, "Viscoelastic Warpage Analysis of Surface Mount Package", Journal of Electronic Packaging, Vol. 123 (2001), pp. 101-104.

Non-patent Literature 3: Hirata and Hashiguchi, "Study of LSI-package Warp Deformation Using FEM Visco-elastic Simulation", Mate 2005, pp. 329-332, 2005.

Non-patent Literature 4: Osamu Ina et al., "The Development of Simulation Technology of Heat Curing Processes of Resins", Denso Technical Review, Vol. 7, No. 2. (2002), pp. 69-75.

Non-patent Literature 5: Miyake, "Thermo-Viscoelastic Analysis for Warpage of Ball Grid Array Packages Taking into Consideration of Chemical Shrinkage of Molding Compound", Transactions of Japan Institute of Electronics Packaging, Vol. 7, No. 1 (2004), pp. 54-61.

The analysis methods whose one example is that recited in the non-patent Literature 4, however, is elasticity analysis, so that coexistence with viscoelasticity analysis is impossible. The reason is that because viscoelasticity and resin curing have been studied individually, no method has been found of coupling the individual time dependencies.

As an attempt to solve the above problem, reported so far is only the method recited in the non-patent Literature 5. This method, however, uses none of theoretical expressions of a resin curing degree as used in the non-patent Literature 4, in which method a change of a curing degree and resultant volume contraction are replaced by a change in a coefficient of linear expansion. Accordingly, since this method, when the coefficient of linear expansion is used as it is in the process of heating, causes a problem of expansion of resin volume to prevent consideration of curing and contraction, operation is executed of replacing the coefficient of linear expansion by a minus value. Furthermore, the coefficient of linear expansion is a parameter of temperature only and is not time-dependent. Therefore, this method uses only a temperature for the link with time-dependent viscoelasticity analysis, which is far from (time-dependent) viscoelasticity analysis taking a resin curing degree changing with a time history into consideration.

THE OBJECT OF THE INVENTION

An object of the present invention is to provide a board or electronic component warp analyzing method, a board or electronic component warp analyzing system and a board or electronic component warp analyzing program which realize viscoelasticity analysis precisely taking a resin curing degree changing as time passes into consideration, which is the above-described problem, by incorporating an algorithm which combines a theoretical expression as a function of time with respect to a resin curing degree, change of Young's modulus and volume change, and with a time base of a characteristic curve (master curve) of viscoelasticity, and enable optimum designing with warps at the stage of development designing suppressed by predicting a change of a resin from molding of an LSI package to a reflow with high precision.

The object is, in particular, to provide a board or electronic component warp analyzing method, a board or electronic component warp analyzing system and a board or electronic component warp analyzing program which enable an optimum condition to be obtained for preventing an warp of an electronic component using a resin material such as a printed wiring board or an LSI package which is used in portable electronic apparatuses whose occurrence of warps becomes conspicuous because of their reduction in weight, length and thickness to have a reduced bending stiffness.

SUMMARY

The present invention relates to a board warp analyzing method of analyzing a warp of a board, which includes processing of, in the calculation of a board warp based on model data including at least a configuration and an elastic constant of the board and an electronic component to be mounted on the board, dividing a temperature profile of the electronic component representing a relationship between a temperature and a time with respect to the electronic component by a predetermined time, obtaining a relaxation elastic modulus of the electronic component corresponding to the divisional time by shifting on a time base of a master curve related to the electronic component which is composed with respect to a reference temperate based on a temperature-time conversion rule, calculating a curing degree of the electronic component based on a relationship between a time as of after the shift and an actually applied temperature and analyzing a warp of the electronic component based on a relaxation elastic modulus on the master curve corresponding to the curing degree or a relaxation elastic modulus calculated based on a relationship between the curing degree and the elastic constant according to the calculated value of the curing degree.

According to the present invention, defective soldering connection caused by a warp can be mitigated to improve connection reliability because a warp can be predicted with high precision to enable a factor affecting a warp to be identified with ease without difficult and time-consuming experiment to be executed at a high temperature.

EXEMPLARY EMBODIMENT

First Mode of Implementation

First mode of implementation of the present invention will be detailed with reference to the drawings.
(Structure of the First Mode of Implementation)

Figure 1:
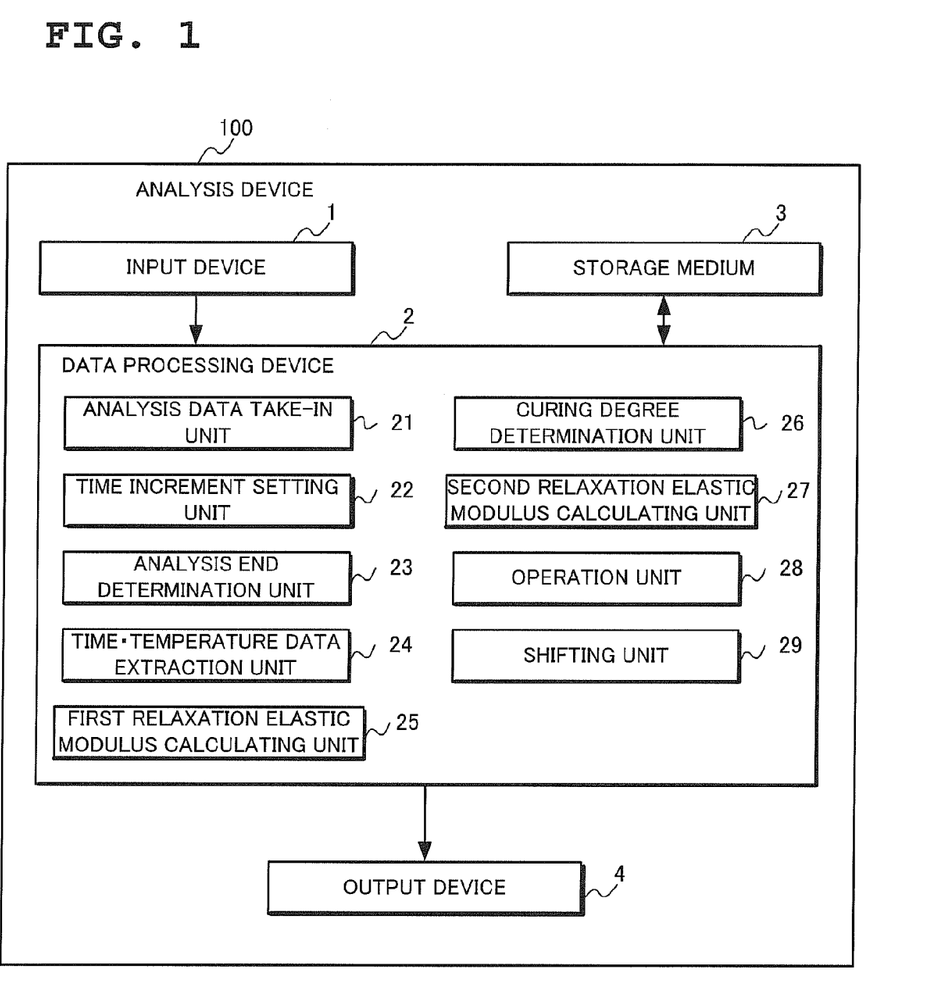
FIG. 1 is a block diagram showing a structure of an analysis device according to a first mode of implementation of the present invention.

FIG. 1 is a block diagram showing a structure of an analysis device according to the first mode of implementation of the present invention.

With reference to FIG. 1, an analysis device 100 according to the present mode of implementation comprises an input device 1, a data processing device 2, a storage medium 3 and an output device 4, in which the data processing device 2 has incorporated an analysis data take-in unit 21, a time increment setting unit 22, an analysis end determination unit 23, a time•temperature data extraction unit 24, a first relaxation elastic modulus calculating unit 25, a unit for determining whether a curing degree is not more than 1 or not, a second relaxation elastic modulus calculating unit 27, an operation unit 28 and a shifting unit 29.

The input device 1 has a function of inputting, to the data processing unit 2, at least configuration data (e.g. CAD data) of a board or an electronic component which is input by a data library or an analyst, more specifically, size, thickness, Young's modulus E, Poisson's ratio v, an elastic material characteristic value such as a coefficient of linear expansion a, and a master curve and a shift curve necessary for viscoelasticity, a curve of a relationship between a curing degree and time obtained by actual measurement and a temperature profile to be applied to a model.

The temperature profile here represents data obtained based on a temperature applied to a target to be analyzed (an electronic component molded whose resin is coated (including a coating resin) or a board with an electronic component mounted after reflow (including an electronic component), which data indicates a relationship between a time change and a temperature change.

The data processing device 2 has a function of executing predetermined processing by taking in data necessary for analysis from the input device 1 and transferring the processed data to the storage medium 3, as well as transferring a processing result to the output device 4.

The storage medium 3 has a function of storing data transferred from the data processing device 2. The storage medium 3 may also have a function of storing data such as at least configuration data of a board or an electronic component input to the data processing device 2, a master curve and a shift curve, a curve of a relationship between a curing degree and time obtained by actual measurement and a temperature profile and in this case, the data processing device 2 is allowed to receive input of the above-described necessary data from the storage medium 3. The storage medium 3 may be provided on a network connected to the data processing device 2.

The master curve here represents a curve indicative of a relationship between a relaxation elastic modulus and time with respect to a resin which coats an electronic component, an underfilling resin for use in reinforcing a soldering connection part or the like, which curve is prepared for each target (e.g. resin which coats an electronic component) whose curing degree is to be determined in order to determine a curing degree of each target.

The output device 4 has a function of outputting analysis data transferred from the data processing device 2 as displaying or the like.

The function of the data processing device 2 will be here detailed.

The analysis data take-in unit 21 has a function of taking in data necessary for analysis from the input device 1.

The time increment setting unit 22 has a function of setting a time increment. More specifically, the time increment setting unit 22 has a time increment set by automatic input or input by an analyst from an input device such as a keyboard based on an entire analysis time. In other words, the entire analysis time is increased by repetitious analysis of each data obtained by dividing data of a temperature profile as of up to the latest time point at which it is input. Therefore, the time increment setting unit 22 sets an increment of an analysis time caused by the division.

In such viscoelastic analysis as described above, it is desirable that data of a temperature profile as of up to a latest input time point should be in the range of $1/10$-$1/100$ experientially. The reason is that unnecessarily too a small time increment will result in drastically increasing an analysis time with an analysis precision barely improved.

The analysis end determination unit 23 has a function of determining whether analysis ends or not based on the number of divisions (time increment) set by the time increment setting unit 22 and when it ends, transferring analysis data to the output device 4 and when the analysis is being executed (when the analysis is yet to end), transferring the analysis data to the time•temperature data extraction unit 24.

The time•temperature data extraction unit 24 has a function of extracting a current time and a temperature to be applied to an analysis model from a temperature profile.

The first relaxation elastic modulus calculating unit 25 has a function of calculating, after shift by a shift factor, an actual relaxation elastic modulus at a current temperature in a master curve composed at a certain reference temperature according to a temperature-time conversion rule with respect to a high molecular material by shifting on the abscissa (time base) as a coordinate of time by a converted time. In other words, the first relaxation elastic modulus calculating unit 25 has a function of calculating a relaxation elastic modulus from an actual master curve at a current temperature after shift by a shift factor of shifting the abscissa (time base).

The curing degree determination unit 26 has a function of calculating a curing degree at a current time after shift by a shift factor and determining whether the value is 1 (curing ends) or not and further whether the value is not more than 1.

The second relaxation elastic modulus calculating unit 27 has a function of, when the value of the curing degree determined by the curing degree determination unit 26 is less than 1, substituting time as of after shift and a current temperature into a relational expression between time and temperature dependent curing degree and Young's modulus which will be described later to calculate Young's modulus and taking the modulus as a relaxation elastic modulus. In other words, the second relaxation elastic modulus calculating unit 27 has a function of calculating a relaxation elastic modulus taking a curing degree into consideration.

The operation unit 28 has a function of calculating a warp and a stress of an analysis model by using a relaxation elastic modulus calculated by the first relaxation elastic modulus calculating unit 25 or a relaxation elastic modulus calculated by the second relaxation elastic modulus calculating unit 27. Although recommended as the operation unit 28 is use of FEM, warps can be calculated even by a theoretical expression of viscoelasticity when a model has a simple configuration such as a layered board.

The shifting unit 29 has a function of transferring, to the analysis end determination unit 23, analysis data transferred from the operation unit 28 with a time increment (one cycle as an increment of an analysis time caused by division) added to a current analysis time.

Figure 2:
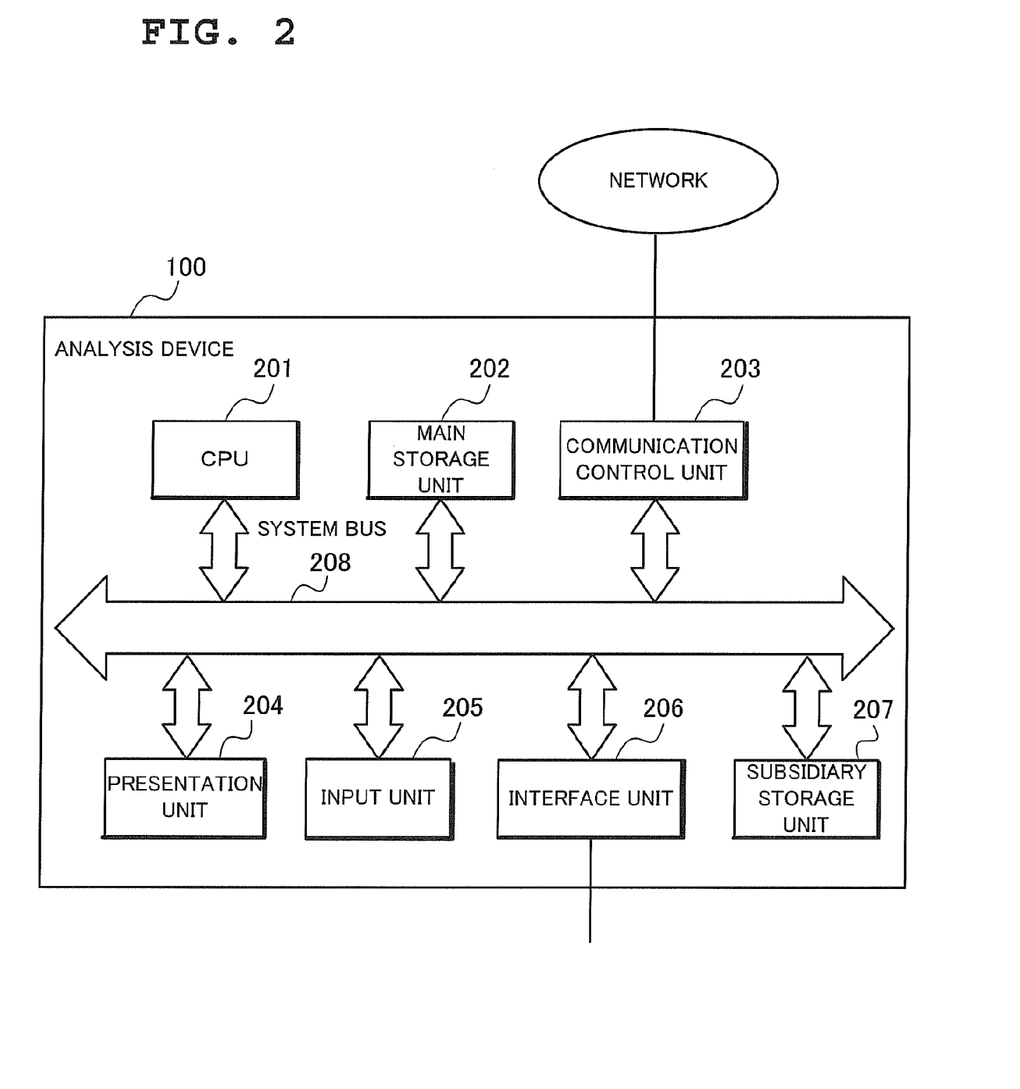
FIG. 2 is a block diagram showing a hardware structure of the analysis device according to the present mode of implementation.

Hardware structure of the analysis device 100 will be here described.

FIG. 2 is a block diagram showing a hardware structure of the analysis device 100 according to the present mode of implementation.

With reference to FIG. 2, the analysis device 100 according to the present invention, which can be realized by the same hardware structure as that of a common computer device, comprises, for example, a CPU (Central Processing Unit) 201, a main storage unit 202 which is a main memory such as a RAM (Random Access Memory) for use as a data working region or a data temporary saving region, a communication control unit 203 (the input device 1, the data processing device 2, the output device 4) which transmits and receives data through a network or the like, a presentation unit 204 (the output device 4) such as a liquid crystal display, a printer or a speaker, an input unit 205 (the input device 1) such as a keyboard or a mouse, an interface unit 206 (the input device 1, the output device 4) connected to a peripheral apparatus for transmitting and receiving data, a subsidiary storage unit 207 (the storage medium 3) as a hard disk device formed of a non-volatile memory such as ROM (Read Only Memory), a magnetic disk or a semiconductor memory, and a system bus 208 which connects the above-described components of the present information processing device with each other.

The analysis device 100 according to the present invention has its operation realized not only in hardware with a circuit component formed of a hardware component such as an LSI (Large Scale Integration) mounted which has a program realizing these functions incorporated in the analysis device 100 but also in software by executing a program which provides each function of the above-described components by the CPU 201 on the computer processing device.

More specifically, the CPU 201 realizes each function described above in software by loading a program stored in the subsidiary storage unit 207 (the storage medium 3) into the main storage unit 202 and executing the same to control operation of the analysis device 100.

Operation of the First Mode of Implementation

Figure 3:
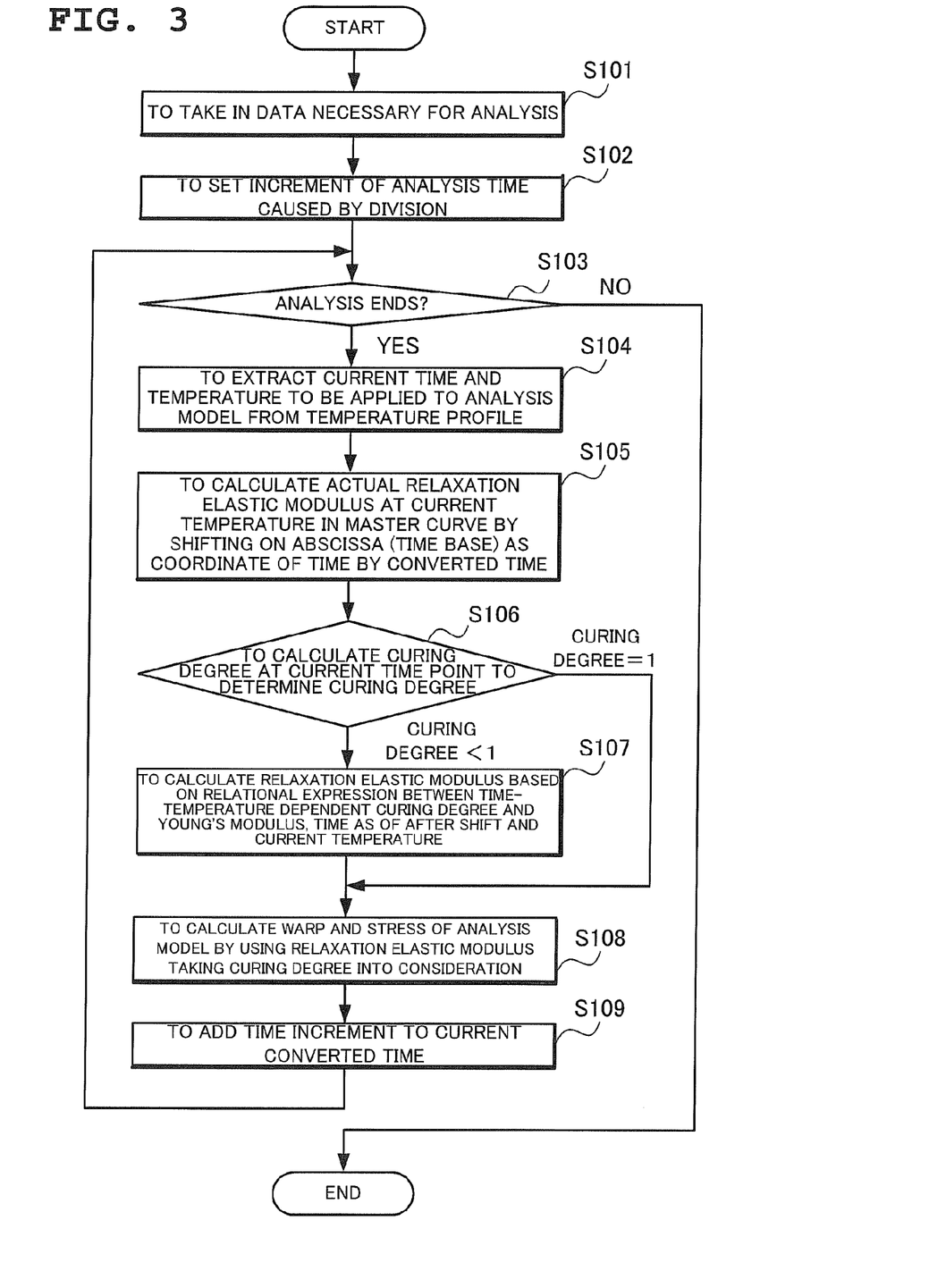
FIG. 3 is a flow chart showing operation of a data processing device of the analysis device according to the present mode of implementation.

FIG. 3 is a flow chart showing operation of the data processing device of the analysis device according to the first mode of implementation of the present invention.

First, the analysis data take-in unit 21 takes in data necessary for analysis from the input device 1 (Step S101). More specifically, the analysis data take-in unit 21 takes in, from the input device 1, at least configuration data of a board or an electronic component, and a master curve and a shift curve necessary for viscoelasticity, a curve of relationship between a curing degree and time obtained by actual measurement, and a temperature profile to be applied to a model which are input by a data library or an analyst.

Next, the time increment setting unit 22 sets a time increment (an increment of an analysis time caused by division) by automatic input or input by an analyst through the input device such as a keyboard based on an entire analysis time (Step S102).

Next, the analysis end determination unit 23 determines whether analysis ends or not based on the number of divisions (time increment) set at Step S102 (Step S103) and when it ends, transfers analysis data to the output device 4 and when the analysis is being executed (when the analysis is yet to end), transfers the analysis data to the time·temperature data extraction unit 24.

Next, the time temperature data extraction unit 24 extracts a current time and a temperature to be applied to an analysis model from the temperature profile (Step S104).

Next, the first relaxation elastic modulus calculating unit 25 calculates, after shift by a shift factor, an actual relaxation elastic modulus at a current temperature in a master curve composed at a certain reference temperature according to a temperature-time conversion rule with respect to a high molecular material by shifting on the abscissa (time base) as a coordinate of time by a converted time (Step S105).

Next, the curing degree determination unit 26 calculates a curing degree at a current time to determine whether the value is 1 (curing ends) or not and further whether the value is not more than 1 (Step S106).

Next, when the curing degree at Step S106 is not more than 1, the second relaxation elastic modulus calculating unit 27, taking the curing degree into consideration, substitutes time as of after shift and a current temperature into a relational expression between time-temperature dependent curing degree and Young's modulus which will be described later to calculate Young's modulus and take the same as a relaxation elastic modulus (Step S107).

Next, the operation unit 28 calculates a warp and a stress of the analysis model by using the relaxation elastic modulus calculated at Step S107 (Step S108).

Next, the shifting unit 29 transfers the analysis data transferred from the operation unit 28 with a time increment added to a current converted time to the analysis end determination unit 23 (Step S109) to again execute the processing starting at Step S103.

On the other hand, when the curing degree at Step S106 is 1, the operation unit 28 calculates a warp and a stress of the analysis model by using the relaxation elastic modulus calculated at Step S105 (Step S108).

Here, description particularly crucial in the present invention will be made of a temperature-time conversion rule, concept of a relaxation elastic modulus—time curve (master curve) of a viscoelastic material using the rule, and a relational expression between a curing degree and Young's modulus.

Figure 4:
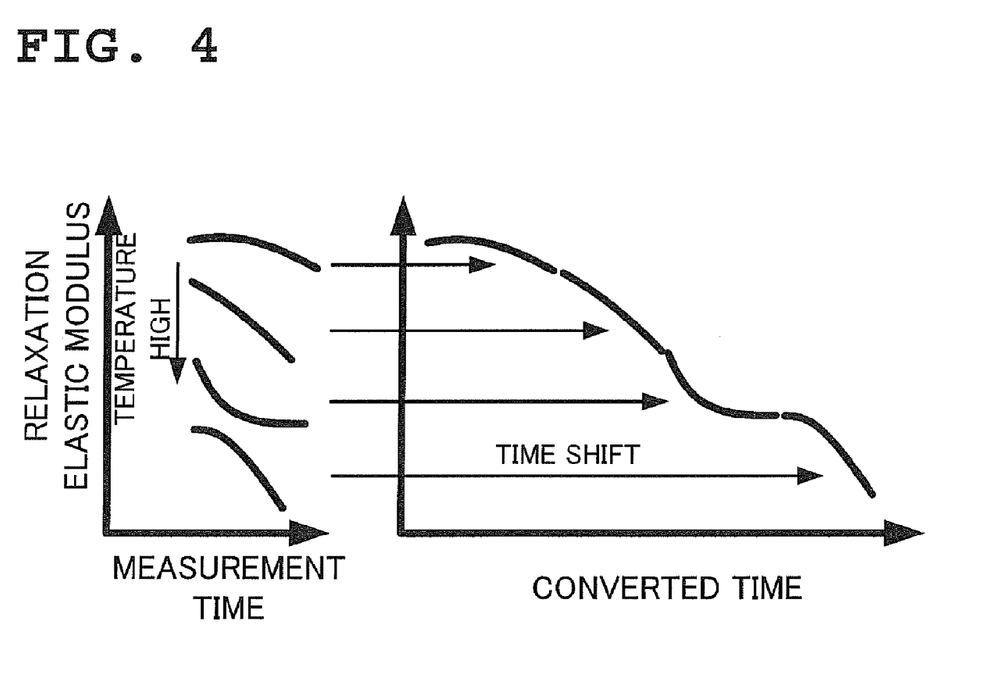
FIG. 4 is a diagram for use in explaining a master curve based on a temperature, a time and an elastic modulus.

FIG. 4 is a diagram for use in explaining a master curve based on temperature, time and elastic modulus.
(Concept of Relaxation Elastic Modulus—Time Curve (Master Curve))

The left diagram in FIG. 4 is a schematic diagram of a measurement result obtained when observing a state how an elastic modulus (Young's modulus) relaxes as time passes with fixed displacement applied to an object to be measured at each temperature and the right diagram in FIG. 4 is a schematic diagram of a master curve formed based on the measurement result.

Here, the above-described object to be measured includes a resin which coats an electronic component, an underfilling resin for use in reinforcing a soldering connection part and the like.

Elastic modulus (Young's modulus) which decreases as time passes with fixed displacement applied will be referred to as a relaxation elastic modulus (ordinate in the left diagram of FIG. 4).

Since it is extremely difficult to measure the relaxation elastic modulus at a fixed temperature for a long period of time, a master curve will be formed using a temperature and time conversion rule which a so-called high molecular material such as a resin has.

Temperature and time conversion rule is that with respect to a high molecular material, a state of a high temperature where a resin is easy to move is equivalent to a state as of after a lapse of a long relaxation time and conversely, a state of a low temperature where a resin is hard to move is equivalent to a state as of after a lapse of a short relaxation time.

By converting, at a certain reference temperature $T_0$, a temperature difference between each measurement temperature and the reference temperature $T_0$ into time according to the conversion rule, a relaxation elastic modulus curve measured at each temperature can be formed into one composite curve. This one composite curve is called a master curve.

In addition, data of the master curve as of after a lapse of a long time can be replaced by data measured at a high temperature for a short time period in place of measurement for a long period of time.

Experimental rule for use in the conversion rule includes Arrhenius' rule and WLF (Williams, Landel, Ferry) rule and the amount of shift of a time base calculated by these experimental rules will be referred to as a shift factor.

As described in the foregoing, one master curve will include relaxation elastic moduli obtained at various temperatures and at various relaxation times (which may also be called a converted time because temperature is converted into time), so that it is essential for operation of a warp taking viscoelasticity into consideration, while the master curve copes with only an object to be measured which is cured.
(Relational Expression Between Curing Degree and Young's Modulus)

Next, description will be made of a relational expression between a curing degree and Young's modulus for use in taking effects of a curing degree into consideration.

With a relaxation elastic modulus (Young's modulus as of before curing) taking a curing degree into consideration expressed as En and Young's modulus at a time point of gelation expressed as Eg, the following holds from the non-patent Literature 4:

$$En = Eg \cdot \exp(f(X)) \tag{1}$$

Here, the followings hold:

$$f(X) = aX^3 + bX^2 + cX + d \tag{2}$$

$$X = \tfrac{1}{3}(4\tau - 1) \tag{3}$$

Parameters a, b, c and d are parameters obtained from experiment for calculating a curing degree.

With $t_0$ as curing time, t as converted time and $\tau$ as curing degree, the following holds:

$$\tau = t/t_0 \qquad (4)$$

By calculating the curing degree $\tau$ from the expression (4), substituting the obtained curing degree into the expression (3) to determine X and substituting X into the cubic polynomial (2) together with the value of the parameter obtained by actual measurement, f(X) is determined, and by linking f(X) with a master curve indicative of time-dependence of a relaxation elastic modulus as of after viscoelasticity is cured by the above-described processing and substituting time as of after time-base direction shift into the expression (1) of the relaxation elastic modulus taking a curing degree into consideration, viscoelasticity analysis is enabled taking a curing degree of a resin into consideration.

(Analysis End Determination Processing)

Figure 5:
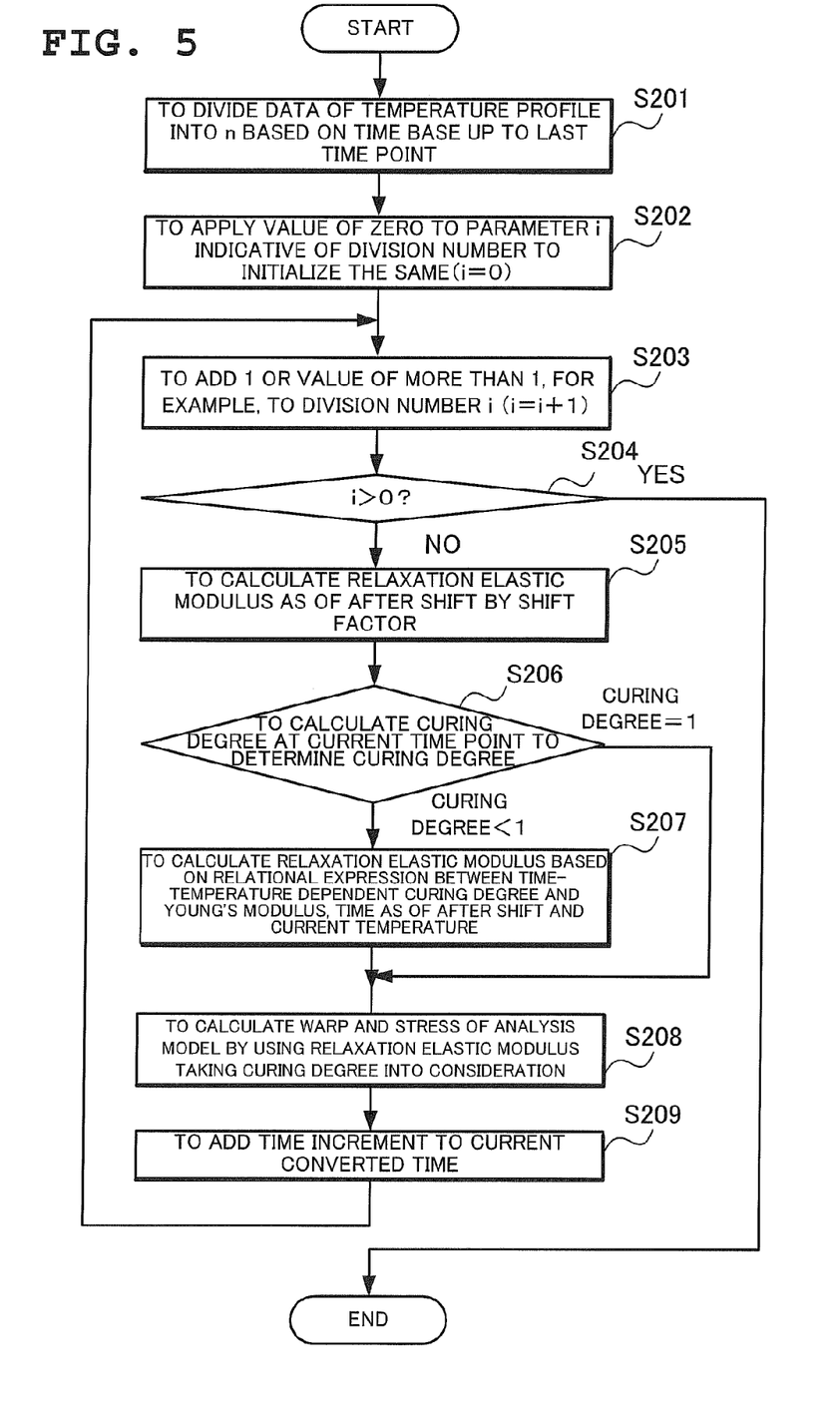
FIG. 5 is a flow chart showing operation of the data processing device of the analysis device according to the present mode of implementation, which operation is centered on analysis end determination processing.

Next, description will be made of operation of the data processing device centered on analysis end determination processing which is in particular crucial in the present invention with reference to the flow chart of FIG. 5. S205 through S209 in FIG. 5 are the same processing as those of S105 through S109 in FIG. 3.

First, the time increment setting unit 22 divides (total number of divisions n) data of a temperature profile input by the analysis data take-in unit 21 based on a time base up to the last time point (Step S201). Although division method may be equipartition, when a temperature has a sharp change, the relevant part may be divided more finely. In addition, although the total number of divisions differs with a maximum time period until the last time point, recommended is the total number of divisions in the range of 10-100.

Next, the time increment setting unit 22 applies the value of zero to the parameter i indicative of the division number to initialize the same (Step S202) and adds 1 or a value more than 1, for example, to the division number i to advance the process to the processing of a division section indicated by the subsequent division number (Step S203).

Next, the analysis end determination unit 23 determines whether the current division number exceeds the total number of divisions n or not (Step S204) and when the number exceeds, the operation ends.

On the other hand, when the current division number fails to exceed the total number of divisions n at Step S204, calculate a relaxation elastic modulus at a time of shift by the shift factor with the current division number i (Step S205).

Next, the curing degree determination unit 26 calculates a curing degree at the shifted time to determine whether the value of the curing degree at the current time point is 1 (end of curing) (Step S206).

When yet to be cured (when curing is yet to be finished: curing degree<1), the relaxation elastic modulus calculating unit 27 calculates Young's modulus from a relational expression between a curing degree and Young's modulus to consider the modulus as a relaxation elastic modulus (Step S207) and when the curing is finished, considers the relaxation elastic modulus calculated at Step S205 as an ultimate relaxation elastic modulus, so that the operation unit 28 calculates a warp and a stress by using a relaxation elastic modulus taking the curing degree calculated at Step S207 or Step S205 into consideration (Step S208) and the shifting unit 29 adds a time increment to the current converted time with respect to analysis data (Step S209) to return to Step S203.

Repetition of the foregoing processing until reaching a predetermined number of divisions (analysis time) enables the data processing device 2 of the present mode of implementation to calculate a warp and a stress of a board changing with a time history to high precision.

In other words, repeating these processing as many times as the required number of divisions enables highly precise prediction of a warp and a stress of an electronic component and a printed wiring board which change with a temperature change.

(Effects of the First Mode of Implementation)

According to the present invention, the following effects can be attained.

The first effect is improvement in connection reliability realized by reduction in defective soldering connection caused by a warp because highly precise prediction of a warp is possible to enable a factor affecting a warp to be identified with ease without difficult and time-consuming experiment at a high temperature.

The reason is that as shown in FIG. 1, the analysis data take-in unit 21 takes in model data indicative of at least configuration of a board and various kinds of electronic components including an LSI package from the input device to take out, from a temperature profile, data of a current time and a temperature at that time which are to be analyzed by the time•temperature data extraction unit 24 for each time increment set by the time increment setting unit 22, so that the first relaxation elastic modulus calculating unit 25 calculates a relaxation elastic modulus as of after shift along a master curve abscissa (time base) based on the taken out data, the curing degree determination unit 26 determines whether a curing degree at the taken out current time and temperature is 1 or less than 1, and when it is less than 1, the second relaxation elastic modulus calculating unit 27 calculates a relaxation elastic modulus taking the curing degree into consideration and when the curing degree is 1, the processing is directly shifted to the operation unit 28 to calculate a warp and a stress by using the calculated relaxation elastic modulus, thereby enabling viscoelasticity of various kinds of resins used in the board and the electronic component to be taken into consideration including effects of a curing degree.

The second effect is improvement in yield because for the above-described reason, warps can be mitigated to facilitate incorporation of a component mounted board into a thin portable apparatus.

The third effect is realization of drastic improvement in connection reliability.

The reason is that because in a package mounted on a printed wiring board by a soldering ball such as BGA (Ball Grid Array) or CSP (Chip Size Package), there occurs a heavy stress on a soldering ball between the LSI package and the printed wiring board due to a difference in a coefficient of linear expansion caused by heat generated during operation, a reinforcing resin is filled and cured after reflow for the purpose of reinforcing a soldering connection part, in which processing, the calculation of a warp and a stress generated during the curing process is difficult, while the present invention enables optimum reinforcing resin and curing conditions to be obtained through a step from molding (curing degree<1) to reflow (curing degree=1) and further by setting a curing degree of only the reinforced resin part to be not more than 1.

Second Mode of Implementation

Next, a second mode of implementation of the present invention will be detailed with reference to the drawings.

Figure 6:
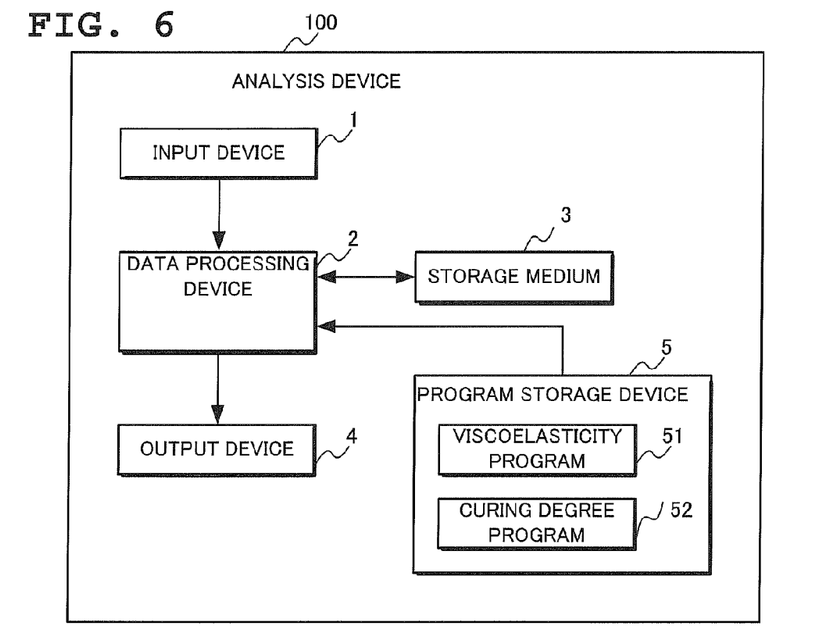
FIG. 6 is a block diagram showing a structure of an analysis device according to a second mode of implementation of the present invention.

With reference to FIG. 6, the second mode of implementation of the present invention comprises, in addition to the input device 1, the data processing device 2, the storage medium 3 and the output device 4 similarly to the first mode of implementation of the present invention, a program storage device 5 which stores a viscoelasticity program 51 and a curing degree program 52.

The viscoelasticity program 51 and the curing degree program 52 control processing and operation of the data read into the data processing device 2 and cause the storage medium 3 to store a processing result of each processing from the data processing device 2.

As described in the foregoing, the data processing device 2 according to the present mode of implementation executes the same processing as that executed by the data processing device 2 according to first mode of implementation under the control by the viscoelasticity program 51 and the curing degree program 52.

First Exemplary Embodiment

Next, a first exemplary embodiment of the present invention will be described with reference to the drawings. Since the present exemplary embodiment corresponds to the first mode of implementation of the present invention, description will be made mainly of a part different from that of the first mode of implementation.

The present exemplary embodiment comprises a keyboard and a mouse as the input device 1, a CPU as the data processing device 2, a magnetic disk storage medium as the storage medium 3 and a display as the output device 4, which operate in the same manner as that in the above-described first mode of implementation.

Figure 7:
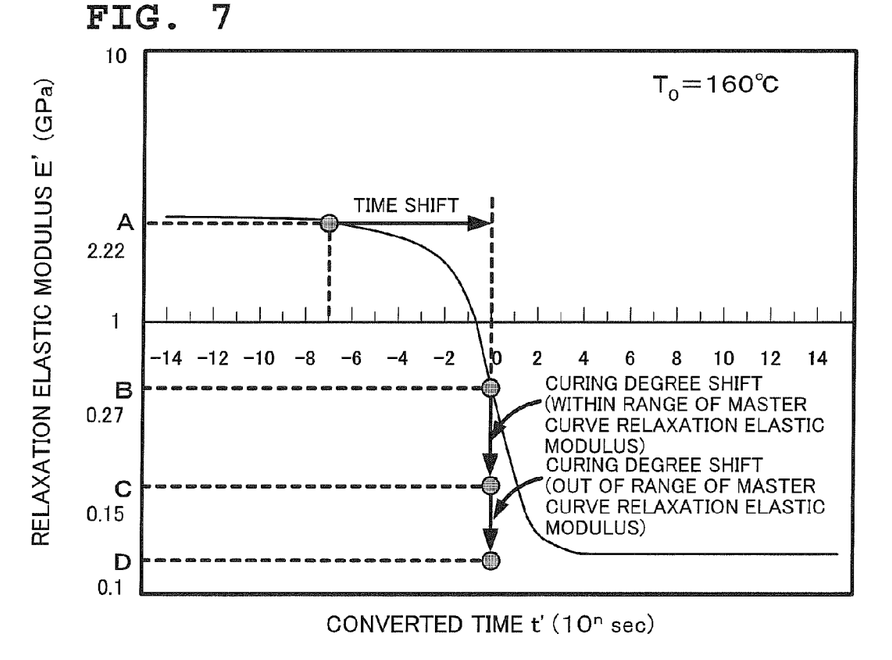
FIG. 7 is a diagram for use in explaining processing of calculating a relaxation elastic modulus taking a curing degree into consideration by using a master curve of an underfilling resin according to a first exemplary embodiment of the present invention.

Here, a specific example will be described by using a master curve of an underfilling resin for use in reinforcing a soldering connection part which is shown in FIG. 7.

Indicated on the abscissa of the master curve shown in FIG. 7 is a converted time t' (sec.) in which only an exponent is indicated. The ordinate represents a relaxation elastic modulus E' whose unit is indicated as GPa, which curve is composed at a reference temperature $T_0 = 160°$ C.

Assume now that the temperature of 200° C. is applied to a model to be analyzed and after a lapse of an extremely short time, a relaxation elastic modulus at the same time point on the master curve (relaxation elastic modulus as of after cure at the master curve reference temperature while analysis is being executed) is A (in FIG. 7, 2.22 Gpa and $10^{-7}$ s).

At this time, there is a difference of 40° C. between the applied temperature 200° C. and the reference temperature $T_0 = 160°$ C.

With the difference based on the temperature-time conversion rule, the above-described first relaxation elastic modulus calculating unit 25 after shift by a shift factor, shifts a time equivalent to an effect by the temperature difference on the abscissa. In this example, for the sake of explanation, the first relaxation elastic modulus calculating unit 25 attains a relaxation elastic modulus at the point B (relaxation elastic modulus as of after curing at a temperature at which the analysis is being made) and a relaxation time (0.27 GPa and 1 s).

Processing up to the shift in the direction of the time base is a method of handling viscoelasticity using a master curve, and the master curve is allowed to handle only a relaxation elastic modulus as of after curing. The present invention is designed to also take effects exerted when a resin is yet to be cured into consideration based on a master curve, which will be detailed in the following.

After the processing by the first relaxation elastic modulus calculating unit 25 after the shift by a shift factor, the curing degree determination unit 26 calculates a current curing degree by using the expression (4) for calculating a curing degree to determine whether curing is completed or not.

Take a case where the curing degree τ=0.5 as an example this time, the following holds from the expression (3) of the parameter X with the curing degree τ:

$$X = \frac{1}{3}(4\tau - 1) = 0.33$$

In addition, substituting a=0, b=−8.8, c=18 and d=0 into the cubic polynomial (2) of X with reference to the non-patent Literature 4 will have the following:

$$f(0.33) = aX^3 + bX^2 + cX + d = 4.98$$

Accordingly, exp (f(X)) in the expression (1) for obtaining a relaxation elastic modulus En taking a curing degree into consideration will be:

$$\exp(f(X)) = 145.5$$

and assuming that Young's modulus Eg at the time of gelation is 1.0 MPa (estimated value), the following is calculated from the expression (1):

$$En = Eg \cdot \exp(f(X)) = 1.0 \cdot 145.5 \approx 0.15 \ (GPa) \ (< 0.27),$$

which corresponds to the point C in FIG. 7 (a relaxation elastic modulus taking effects of yet-to-be-cured into consideration while the analysis is executed).

(Effects of the First Exemplary Embodiment)

Thus, when curing is yet to be completed, there exists a relaxation elastic modulus to be obtained at a position where a relaxation elastic modulus is shifted in the descending direction on the ordinate after shifting the master curve in the direction of the abscissa, so that a relaxation elastic modulus C taking a curing degree into consideration can be obtained by the present invention.

Furthermore, after a lapse of a long period of time on the master curve, a relaxation elastic modulus as of after curing goes constant, while depending on a state of curing, it might go lower than the fixed value, and as indicated at the point D in FIG. 7 (relaxation elastic modulus taking effects of yet-to-be-cured into consideration while the analysis is being made), a relaxation elastic modulus taking a curing degree into consideration can be also calculated outside a range of a relaxation elastic modulus on the master curve formed based on actual measurement data.

While the present invention has been described in the foregoing with respect to the preferred modes of implementation (and the exemplary embodiment), the present invention is not limited to the above-described modes of implementation (and the exemplary embodiment). The structure and details of the present invention allow various modifications within the scope of the present invention that those skilled in the art can understand.

For example, while in each of the above-described modes of implementation and exemplary embodiment, a relaxation elastic modulus is calculated taking a curing degree into consideration with respect to a board on which an electronic component is mounted, a relaxation elastic modulus may be calculated taking a curing degree into consideration with respect to a single or a plurality of electronic components mounted on a board.

The present invention enables improvement in connection reliability by reduction in defective soldering connection which is caused by a warp because highly precise prediction of a warp is possible to enable a factor affecting a warp to be identified with ease without difficult and time-consuming experiment at a high temperature.

The reason is that because in the calculation of a warp of a board based on model data including at least a configuration and an elastic constant of the board and an electronic component including various kinds of components to be mounted on the board, a temperature profile of the electronic component indicative of a relationship between temperature and time with respect to the electronic component is divided by a predetermined time to obtain a relaxation elastic modulus of the electronic component corresponding to the relevant divisional time by shifting on the time base of a master curve related to the electronic component which is composed with respect to a reference temperature based on a temperature-time conversion rule, calculate a curing degree related to the electronic component based on a relationship between the time as of after shift and an actually applied temperature, and analyze a warp of the electronic component based on a relaxation elastic modulus on the master curve corresponding to the curing degree or a relaxation elastic modulus calculated based on a relationship between a curing degree and an elastic constant according to a value of the calculated curing degree, viscoelasticity of the board and the electronic component can be taken into consideration including effects of a curing degree.

In addition, because the present invention realizes reduction in warps for the above-described reason, incorporation of a component mounted board into a thin portable apparatus is facilitated to improve yield.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable for use in considering warp reduction measures by predicting, to high precision, a change of a resin from molding to reflow of an LSI package in a design section which is demanded to develop a portable electronic component or the like in a short time period.

The invention claimed is:

1. A board warp analysis method of analyzing a warp of a board, comprising the following steps executed by a data processing device,
in board warp calculation based on model data including at least a configuration and an elastic constant of said board and an electronic component mounted on said board:
dividing, by the data processing device, a temperature profile indicative of a relationship between a temperature and a time with respect to said electronic component by a predetermined time,
obtaining, by the data processing device, a relaxation elastic modulus of said electronic component corresponding to the divisional time by shifting on a time base of a master curve related to said electronic component which is composed with respect to a reference temperature based on a temperature-time conversion rule,
calculating, by the data processing device, a curing degree of said electronic component based on a relationship between a time after shift and an actually applied temperature, and
analyzing, by the data processing device, a warp of said electronic component based on a relaxation elastic modulus on said master curve corresponding to said curing degree or a relaxation elastic modulus calculated based on a relationship between said curing degree and said elastic constant according to a value of said curing degree calculated, wherein
when said curing degree calculated indicates curing-end, a warp and a stress of said electronic component are analyzed based on a relaxation elastic modulus on said master curve corresponding to said curing degree, and
when said curing degree indicates yet-to-be-cured, a warp and a stress of said electronic component are analyzed based on a relaxation elastic modulus calculated based on the relationship between said curing degree and said elastic constant,
wherein said analysis executed on a basis of a unit of division obtained by dividing said temperature profile by a predetermined time includes:
a time division step of dividing said temperature profile by a predetermined time,
an initialization step of initializing a parameter indicative of a division number of said division unit,
a division number change step of changing a parameter indicative of said division number in ascending order or descending order, and
a determination step of determining whether said division number changed exceeds the total number of divisions, and wherein
when the division number exceeds the total number of divisions, operation is ended and when not exceeding, a relaxation elastic modulus corresponding to said division unit is calculated.

2. The board warp analysis method according to claim 1, wherein the master curve related to said electronic component is a curve indicative of a relationship between a relaxation elastic modulus and time with respect to a resin coating said electronic component.

3. The board warp analysis method according to claim 1, wherein the curing degree related to said electronic component is a curing degree as of a relevant time point after said shift with respect to the resin coating said electronic component.

4. The board warp analysis method according to claim 1, wherein the analysis processing is repeated as many times as the number of time divisions of said temperature profile.

5. The board warp analysis method according to claim 1, wherein at said time division step, as a method of segmenting a time base of said temperature profile, equipartition or segmentation of a part whose temperature change is sharp is executed.

6. The board warp analysis method according to claim 1, wherein at said initialization step, the value of zero is applied to said parameter indicative of said division number for initializing said parameter.

7. The board warp analysis method according to claim 1, wherein said division number change step is processing of incrementing said division number, in which the division number is incremented by 1 or not less than 1.

8. The board warp analysis method according to claim 1, wherein in the calculation of a relaxation elastic modulus corresponding to said division unit, at a time and a temperature of said temperature profile at said division number changed, a relaxation elastic modulus is calculated at said division number obtained after shifting on a time base of said master curve according to a shift factor.

9. An electronic component warp analysis method of analyzing a warp of an electronic component, comprising the following steps executed by a data processing device, in electronic component warp calculation based on model data including at least a configuration and an elastic constant of said electronic component:
- dividing, by the data processing device, a temperature profile indicative of a relationship between a temperature and a time with respect to said electronic component by a predetermined time,
- obtaining, by the data processing device, a relaxation elastic modulus of said electronic component corresponding to the divisional time by shifting on a time base of a master curve related to said electronic component which is composed with respect to a reference temperature based on a temperature-time conversion rule,
- calculating, by the data processing device, a curing degree of said electronic component based on a relationship between a time after shift and an actually applied temperature, and
- analyzing, by the data processing device, a warp of said electronic component based on a relaxation elastic modulus on said master curve corresponding to said curing degree or a relaxation elastic modulus calculated based on a relationship between said curing degree and said elastic constant according to a value of said curing degree calculated, wherein
- when said curing degree calculated indicates curing-end, a warp and a stress of said electronic component are analyzed based on a relaxation elastic modulus on said master curve corresponding to said curing degree, and
- when said curing degree indicates yet-to-be-cured, a warp and a stress of said electronic component are analyzed based on a relaxation elastic modulus calculated based on the relationship between said curing degree and said elastic constant,
- wherein said analysis executed on a basis of a unit of division obtained by dividing said temperature profile by a predetermined time includes:
- a time division step of dividing said temperature profile by a predetermined time,
- an initialization step of initializing a parameter indicative of a division number of said division unit,
- a division number change step of changing a parameter indicative of said division number in ascending order or descending order, and
- a determination step of determining whether said division number changed exceeds the total number of divisions, and wherein
- when the division number exceeds the total number of divisions, operation is ended and when not exceeding, a relaxation elastic modulus corresponding to said division unit is calculated.

10. The electronic component warp analysis method according to claim 9, wherein the master curve related to said electronic component is a curve indicative of a relationship between a relaxation elastic modulus and time with respect to a resin coating said electronic component.

11. The electronic component warp analysis method according to claim 9, wherein the curing degree related to said electronic component is a curing degree as of a relevant time point after said shift with respect to the resin coating said electronic component.

12. The electronic component warp analysis method according to claim 9, wherein the analysis processing is repeated as many times as the number of time divisions of said temperature profile.

13. The board warp analysis method according to claim 9, wherein at said time division step, as a method of segmenting a time base of said temperature profile, equipartition or segmentation of a part whose temperature change is sharp is executed.

14. The board warp analysis method according to claim 9, wherein at said initialization step, the value of zero is applied to said parameter indicative of said division number for initializing said parameter.

15. The board warp analysis method according to claim 9, wherein said division number change step is processing of incrementing said division number, in which the division number is incremented by 1 or not less than 1.

16. The board warp analysis method according to claim 9, wherein in the calculation of a relaxation elastic modulus corresponding to said division unit, at a time and a temperature of said temperature profile at said division number changed, a relaxation elastic modulus is calculated at said division number obtained after shifting on a time base of said master curve according to a shift factor.

17. A board warp analysis system of analyzing a warp of a board, comprising,
- in board warp calculation based on model data including at least a configuration and an elastic constant of said board and an electronic component mounted on said board, comprising:
- division unit for dividing a temperature profile indicative of a relationship between a temperature and a time with respect to said electronic component by a predetermined time,
- obtaining unit for obtaining a relaxation elastic modulus of said electronic component corresponding to the divisional time by shifting on a time base of a master curve related to said electronic component which is composed with respect to a reference temperature based on a temperature-time conversion rule,
- curing degree calculation unit for calculating a curing degree of said electronic component based on a relationship between a time after shift and an actually applied temperature, and
- analysis unit for analyzing a warp and a stress of said electronic component based on a relaxation elastic modulus on said master curve corresponding to said curing degree or a relaxation elastic modulus calculated based on a relationship between said curing degree and said elastic constant according to a value of said curing degree calculated,
- wherein said analysis unit
- when said curing degree calculated indicates curing-end, analyzes a warp and a stress of said electronic component based on a relaxation elastic modulus on said master curve corresponding to said curing degree, and
- when said curing degree indicates yet-to-be-cured, analyzes a warp and a stress of said electronic component based on a relaxation elastic modulus calculated based on the relationship between said curing degree and said elastic constant,
- further including:
- initialization unit for initializing a parameter indicative of a division number of said division unit,
- division number changing unit for changing a parameter indicative of said division number in ascending order or descending order, and
- determination unit for determining whether said division number changed exceeds the total number of divisions, wherein
- when the division number exceeds the total number of divisions, operation is ended and when failing to exceed, said obtaining unit obtains a relaxation elastic modulus of said electronic component corresponding to the division time, said curing degree calculation unit calculates a curing degree, said analysis unit analyzes a warp and a stress of said electronic component based on a relaxation elastic modulus corresponding to said division unit according to a value of said curing degree calculated, and said processing is executed on a basis of a unit of division obtained by dividing said temperature profile by a predetermined time.

18. The board warp analysis system according to claim 17, wherein the master curve related to said electronic component is a curve indicative of a relationship between a relaxation elastic modulus and time with respect to a resin coating said electronic component.

19. The board warp analysis system according to claim 17, wherein the curing degree related to said electronic component is a curing degree as of a relevant time point after said shift with respect to the resin coating said electronic component.

20. The board warp analysis system according to claim 17, wherein said obtaining unit, said curing degree calculation unit and said analysis unit repeat the processing as many times as the number of time divisions of said temperature profile.

21. The board warp analysis system according to claim 17, wherein said division unit executes, as a method of segmenting a time base of said temperature profile, equipartition or segmentation of a part whose temperature change is sharp is executed.

22. The board warp analysis system according to claim 17, wherein said initialization unit applies the value of zero to said parameter indicative of said division number for initializing said parameter.

23. The board warp analysis system according to claim 17, wherein said division number changing unit increments said division number by 1 or not less than 1.

24. The board warp analysis system according to claim 17, wherein in the calculation of a relaxation elastic modulus corresponding to said division unit by said obtaining unit, at a time and a temperature of said temperature profile at said division number changed, a relaxation elastic modulus is calculated at said division number obtained after shifting on a time base of said master curve according to a shift factor.

25. An electronic component warp analysis system for analyzing a warp of an electronic component, comprising, in electronic warp calculation based on model data including at least a configuration and an elastic constant of said electronic component:

division unit for dividing a temperature profile indicative of a relationship between a temperature and a time with respect to said electronic component by a predetermined time, obtaining unit for obtaining a relaxation elastic modulus of said electronic component corresponding to the divisional time by shifting on a time base of a master curve related to said electronic component which is composed with respect to a reference temperature based on a temperature-time conversion rule, curing degree calculation unit for calculating a curing degree of said electronic component based on a relationship between a time after shift and an actually applied temperature, and an analysis unit for analyzing a warp and a stress of said electronic component based on a relaxation elastic modulus on said master curve corresponding to said curing degree or a relaxation elastic modulus calculated based on a relationship between said curing degree and said elastic constant according to a value of said curing degree calculated, wherein said analysis unit when said curing degree calculated indicates curing-end, analyzes a warp and a stress of said electronic component based on a relaxation elastic modulus on said master curve corresponding to said curing degree, and when said curing degree indicates yet-to-be-cured, analyzes a warp and a stress of said electronic component based on a relaxation elastic modulus calculated based on the relationship between said curing degree and said elastic constant, further including:

initialization unit for initializing a parameter indicative of a division number of said division unit, division number changing unit for changing a parameter indicative of said division number in ascending order or descending order, and determination unit for determining whether said division number changed exceeds the total number of divisions, wherein when the division number exceeds the total number of divisions, operation is ended and when failing to exceed, said obtaining unit obtains a relaxation elastic modulus of said electronic component corresponding to the division time, said curing degree calculation unit calculates a curing degree, said analysis unit analyzes a warp and a stress of said electronic component based on a relaxation elastic modulus corresponding to said division unit according to a value of said curing degree calculated, and said processing is executed on a basis of a unit of division obtained by dividing said temperature profile by a predetermined time.

26. The electronic component warp analysis system according to claim 25, wherein the master curve related to said electronic component is a curve indicative of a relationship between a relaxation elastic modulus and time with respect to a resin coating said electronic component.

27. The electronic component warp analysis system according to claim 25, wherein the curing degree related to said electronic component is a curing degree as of a relevant time point after said shift with respect to the resin coating said electronic component.

28. The electronic component warp analysis system according to claim 25, wherein said obtaining unit, said curing degree calculation unit and said analysis unit repeat the processing as many times as the number of time divisions of said temperature profile.

29. The electronic component warp analysis system according to claim 25, wherein said division unit executes, as a method of segmenting a time base of said temperature profile, equipartition or segmentation of a part whose temperature change is sharp is executed.

30. The electronic component warp analysis system according to claim 25, wherein said initialization unit applies the value of zero to said parameter indicative of said division number for initializing said parameter.

31. The electronic component warp analysis system according to claim 25, wherein said division number changing unit increments said division number by 1 or not less than 1.

32. The electronic component warp analysis system according to claim 25, wherein in the calculation of a relaxation elastic modulus corresponding to said division unit by said obtaining unit, at a time and a temperature of said temperature profile at said division number changed, a relaxation elastic modulus is calculated at said division number obtained after shifting on a time base of said master curve according to a shift factor.

33. A non-transitory computer readable medium for storing a board warp analysis program realized on a board warp analysis system of analyzing a warp of a board, which causes,
in board warp calculation based on model data including at least a configuration and an elastic constant of said board and an electronic component mounted on said board,
division unit to execute division processing of dividing a temperature profile indicative of a relationship between a temperature and a time with respect to said electronic component by a predetermined time,
obtaining unit to execute obtaining processing of obtaining a relaxation elastic modulus of said electronic component corresponding to the divisional time by shifting on a time base of a master curve related to said electronic component which is composed with respect to a reference temperature based on a temperature-time conversion rule,
curing degree calculating unit to execute curing degree calculation processing of calculating a curing degree of said electronic component based on a relationship between a time after shift and an actually applied temperature, and
analysis unit to execute analysis processing of analyzing a warp and a stress of said electronic component based on a relaxation elastic modulus on said master curve corresponding to said curing degree or a relaxation elastic modulus calculated based on a relationship between said curing degree and said elastic constant according to a value of said curing degree calculated,
wherein in said analysis processing,
when said curing degree calculated indicates curing-end, a warp and a stress of said electronic component are analyzed based on a relaxation elastic modulus on said master curve corresponding to said curing degree, and
when said curing degree indicates yet-to-be-cured, a warp and a stress of said electronic component are analyzed based on a relaxation elastic modulus calculated based on the relationship between said curing degree and said elastic constant,
further including:
said division processing,
initialization processing by initialization unit of initializing a parameter indicative of a division number of said division unit,
division number changing processing by division number changing unit of changing a parameter indicative of said division number in ascending order or descending order, and
determination processing by determination unit of determining whether said division number changed exceeds the total number of divisions, wherein
when the division number exceeds the total number of divisions, operation is ended and when failing to exceed, a relaxation elastic modulus of said electronic component corresponding to the division time is obtained in said obtaining processing,
a curing degree is calculated in said curing degree calculation processing,
a warp and a stress of said electronic component are analyzed by said analysis unit based on a relaxation elastic modulus corresponding to said division unit according to a value of said curing degree calculated, and
said processing is executed on a basis of a unit of division obtained by dividing said temperature profile by a predetermined time.

34. The non-transitory computer readable medium for storing the board warp analysis program according to claim 33, wherein the master curve related to said electronic component is a curve indicative of a relationship between a relaxation elastic modulus and time with respect to a resin coating said electronic component.

35. The non-transitory computer readable medium for storing the board warp analysis program according to claim 33, wherein the curing degree related to said electronic component is a curing degree as of a relevant time point after said shift with respect to the resin coating said electronic component.

36. The non-transitory computer readable medium for storing the board warp analysis program according to claim 33, wherein in said obtaining processing, said curing degree calculation processing and said analysis processing, the processing is repeated as many times as the number of time divisions of said temperature profile.

37. The non-transitory computer readable medium for storing the board warp analysis program according to claim 33, wherein in said division processing, as a method of segmenting a time base of said temperature profile, equipartition or segmentation of a part whose temperature change is sharp is executed.

38. The non-transitory computer readable medium for storing the board warp analysis program according to claim 33, wherein in said initialization processing, the value of zero is applied to said parameter indicative of said division number for initializing said parameter.

39. The non-transitory computer readable medium for storing the board warp analysis program according to claim 33, wherein in said division number changing processing, said division number is incremented by 1 or not less than 1.

40. The non-transitory computer readable medium for storing the board warp analysis program according to claim 33, wherein in the calculation of a relaxation elastic modulus corresponding to said division unit by said obtaining processing, at a time and a temperature of said temperature profile at said division number changed, a relaxation elastic modulus is calculated at said division number obtained after shifting on a time base of said master curve according to a shift factor.

41. A non-transitory computer readable medium for storing a program for analyzing a warp of an electronic component which is realized on an electronic component warp analysis system of analyzing a warp of an electronic component, which causes,
in board warp calculation based on model data including at least a configuration and an elastic constant of said electronic component,
division unit to execute division processing of dividing a temperature profile indicative of a relationship between a temperature and a time with respect to said electronic component by a predetermined time,
obtaining unit to execute obtaining processing of obtaining a relaxation elastic modulus of said electronic component corresponding to the divisional time by shifting on a time base of a master curve related to said electronic component which is composed with respect to a reference temperature based on a temperature-time conversion rule, curing degree calculating unit to execute curing degree calculation processing of calculating a curing degree of said electronic component based on a relationship between a time after shift and an actually applied temperature, and analysis unit to execute analysis processing of analyzing a warp and a stress of said electronic component based on a relaxation elastic modulus on said master curve corresponding to said curing degree or a relaxation elastic modulus calculated based on a relationship between said curing degree and said elastic constant according to a value of said curing degree calculated, wherein in said analysis processing, when said curing degree calculated indicates curing-end, a warp and a stress of said electronic component are analyzed based on a relaxation elastic modulus on said master curve corresponding to said curing degree, and when said curing degree indicates yet-to-be cured, a warp and a stress of said electronic component are analyzed based on a relaxation elastic modulus calculated based on a relationship between said curing degree and said elastic constant, further including:

said division processing, initialization processing by initialization unit of initializing a parameter indicative of a division number of said division unit, division number changing processing by division number changing unit of changing a parameter indicative of said division number in ascending order or descending order, and determination processing by determination unit of determining whether said division number changed exceeds the total number of divisions, wherein when the division number exceeds the total number of divisions, operation is ended and when failing to exceed, a relaxation elastic modulus of said electronic component corresponding to said division time is obtained in said obtaining processing, a curing degree is calculated in said curing degree calculation processing, a warp and a stress of said electronic component are analyzed by said analysis unit based on a relaxation elastic modulus corresponding to said division unit according to a value of said curing degree calculated, and said processing is executed on a basis of a unit of division obtained by dividing said temperature profile by a predetermined time.

42. The non-transitory computer readable medium for storing the electronic component warp analysis program according to claim 41, wherein the master curve related to said electronic component is a curve indicative of a relationship between a relaxation elastic modulus and time with respect to a resin coating said electronic component.

43. The non-transitory computer readable medium for storing the electronic component warp analysis program according to claim 41, wherein the curing degree related to said electronic component is a curing degree as of a relevant time point after said shift with respect to the resin coating said electronic component.

44. The non-transitory computer readable medium for storing the electronic component warp analysis program according to claim 41, wherein in said obtaining processing, said curing degree calculation processing and said analysis processing, the processing is repeated as many times as the number of time divisions of said temperature profile.

45. The non-transitory computer readable medium for storing the electronic component warp analysis program according to claim 41, wherein in said division processing, as a method of segmenting a time base of said temperature profile, equipartition or segmentation of a part whose temperature change is sharp is executed.

46. The non-transitory computer readable medium for storing the electronic component warp analysis program according to claim 41, wherein in said initialization processing, the value of zero is applied to said parameter indicative of said division number for initializing said parameter.

47. The non-transitory computer readable medium for storing the electronic component warp analysis program according to claim 41, wherein in said division number changing processing, said division number is incremented by 1 or not less than 1.

48. The non-transitory computer readable medium for storing the electronic component warp analysis program according to claim 41, wherein in the calculation of a relaxation elastic modulus corresponding to said division unit by said obtaining processing, at a time and a temperature of said temperature profile at said division number changed, a relaxation elastic modulus is calculated at said division number obtained after shifting on a time base of said master curve according to a shift factor.

* * * * *